(12) United States Patent
Shinohara

(10) Patent No.: US 12,291,059 B2
(45) Date of Patent: May 6, 2025

(54) HEAVY DUTY PNEUMATIC TIRE

(71) Applicant: SUMITOMO RUBBER INDUSTRIES, LTD., Hyogo (JP)

(72) Inventor: Hiroki Shinohara, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/379,006

(22) Filed: Oct. 11, 2023

(65) Prior Publication Data

US 2024/0131870 A1   Apr. 25, 2024
US 2024/0227453 A9   Jul. 11, 2024

(30) Foreign Application Priority Data

Oct. 24, 2022  (JP) .................. 2022-170075

(51) Int. Cl.
  *B60C 11/03*   (2006.01)
(52) U.S. Cl.
  CPC .......... *B60C 11/03* (2013.01); *B60C 11/0306* (2013.01); *B60C 2011/0344* (2013.01); *B60C 2011/0346* (2013.01); *B60C 2011/0355* (2013.01); *B60C 2011/0358* (2013.01); *B60C 2011/036* (2013.01); *B60C 2011/0362* (2013.01); *B60C 2200/06* (2013.01)
(58) Field of Classification Search
  CPC ................................................. B60C 11/0306
  See application file for complete search history.

(56) References Cited

U.S. PATENT DOCUMENTS 4,320,790 A * 3/1982 Corner ................ B60C 11/11
                                                  152/209.27
9,221,305 B2   12/2015 Washizuka

FOREIGN PATENT DOCUMENTS

JP          03038406 A  *  2/1991
JP       2013-144526 A     7/2013

OTHER PUBLICATIONS

Machine translation: JP-03038406-A, Ichiki Y, (Year: 2024).*

* cited by examiner

*Primary Examiner* — Kendra Ly
(74) *Attorney, Agent, or Firm* — Greenblum & Bernstein, P.L.C.

(57) ABSTRACT

A heavy duty pneumatic tire includes a crown circumferential groove, a shoulder circumferential groove, crown lateral grooves, and crown blocks. The crown circumferential groove includes crown first-side vertexes and crown second-side vertexes and thus zigzags. The shoulder circumferential groove includes shoulder inner-side vertexes and shoulder outer-side vertexes. The crown lateral grooves are disposed at two pitch intervals of a zigzag of the crown circumferential groove and connect between the crown first-side vertexes and the shoulder inner-side vertexes. The crown blocks have crown sub-grooves having a groove width less than a groove width of the crown lateral groove. The crown sub-groove includes at least two transverse grooves extending across the crown block.

20 Claims, 5 Drawing Sheets

HEAVY DUTY PNEUMATIC TIRE

CROSS REFERENCE TO RELATED APPLICATION

The present application claims priority to Japanese patent application JP 2022-170075, filed on Oct. 24, 2022, the entire contents of which are incorporated herein by reference in its entirety.

BACKGROUND

Technical Field

The present disclosure relates to a heavy duty pneumatic tire.

Background Art

Japanese Laid-Open Patent Publication No. 2013-144526 discloses a heavy duty pneumatic tire in which a plurality of center blocks are demarcated by shoulder main grooves, a center main groove, and center lateral grooves. The center lateral grooves are disposed at every other inner-side zigzag vertex of the shoulder main groove. The center blocks formed by the center lateral grooves having such a structure have high stiffness in the tire circumferential direction.

Since the center blocks have high stiffness in the tire circumferential direction, the above-described heavy duty pneumatic tire has excellent uneven wear resistance in the blocks. Meanwhile, an arrangement pitch at which the center lateral grooves are arranged in the tire circumferential direction is large, so that there is room for further improving traction performance (hereinafter, referred to as "wet traction performance") on a wet road surface.

The present disclosure has been made in view of the aforementioned circumstances, and a main object of the present disclosure is to provide a heavy duty pneumatic tire that can enhance wet traction performance while maintaining excellent uneven wear resistance.

SUMMARY

The present disclosure is directed to a heavy duty pneumatic tire including a tread portion. The tread portion includes a crown circumferential groove continuously extending on a tire equator side in a tire circumferential direction, a shoulder circumferential groove continuously extending in the tire circumferential direction on a side outward of the crown circumferential groove in a tire axial direction, a plurality of crown lateral grooves connecting between the crown circumferential groove and the shoulder circumferential groove, and a plurality of crown blocks formed by the crown circumferential groove, the shoulder circumferential groove, and the plurality of crown lateral grooves. The crown circumferential groove includes crown first-side vertexes protruding toward the shoulder circumferential groove, and crown second-side vertexes protruding in a direction opposite to that of the crown first-side vertexes, alternately in the tire circumferential direction, and zigzags. The shoulder circumferential groove includes shoulder inner-side vertexes protruding toward the crown circumferential groove, and shoulder outer-side vertexes protruding in a direction opposite to that of the shoulder inner-side vertexes, alternately in the tire circumferential direction, and zigzags. The plurality of crown lateral grooves that are directly adjacent to each other in the tire circumferential direction are disposed at two pitch intervals of a zigzag of the crown circumferential groove and connect between the crown first-side vertexes and the shoulder inner-side vertexes. The plurality of crown blocks has a plurality of crown sub-grooves each having a groove width less than a groove width of each of the plurality of crown lateral grooves. The plurality of crown sub-grooves each include at least two transverse grooves extending across the crown blocks.

DETAILED DESCRIPTION

One embodiment of the present disclosure will be described below with reference to the drawings.

Figure 1:
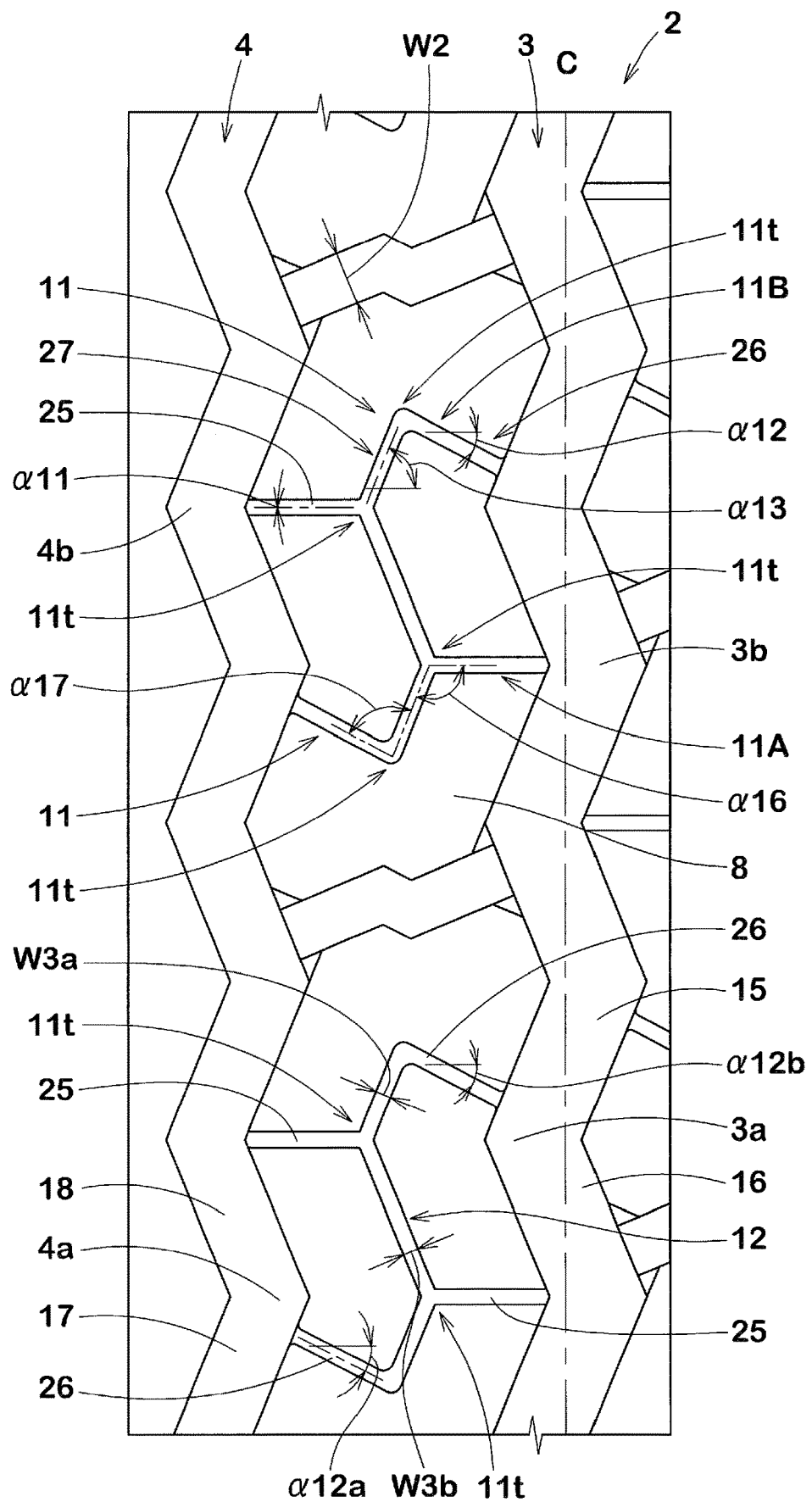
FIG. 1 is an enlarged plan view of a tread portion of a heavy duty tire according to one embodiment of the present disclosure.

FIG. 1 is an enlarged plan view of a tread portion 2 of a heavy duty pneumatic tire (hereinafter, may be simply referred to as "tire") 1 of the present embodiment. The tire 1 of the present embodiment is suitably used as a tire for, for example, trucks and buses.

The tread portion 2 includes a crown circumferential groove 3, shoulder circumferential grooves 4, a plurality of crown lateral grooves 5, and a plurality of crown blocks 8. The crown circumferential groove 3 continuously extends on a tire equator C side in the tire circumferential direction. The shoulder circumferential groove 4 continuously extends in the tire circumferential direction, on the side outward of the crown circumferential groove 3 in the tire axial direction. Each crown lateral groove 5 connects between the crown circumferential groove 3 and the shoulder circumferential groove 4. Each crown block 8 is formed by the crown circumferential groove 3, the shoulder circumferential groove 4, and a plurality of the crown lateral grooves 5.

The crown circumferential groove 3 includes crown first-side vertexes 3a protruding toward the shoulder circumferential groove 4, and crown second-side vertexes 3b protruding in the direction opposite to that of the crown first-side vertex 3a, alternately in the tire circumferential direction, and thus zigzags.

The shoulder circumferential groove 4 includes shoulder inner-side vertexes 4a protruding toward the crown circumferential groove 3, and shoulder outer-side vertexes 4b protruding in the direction opposite to that of the shoulder inner-side vertex 4a, alternately in the tire circumferential direction, and thus zigzags.

The plurality of crown lateral grooves 5 that are directly adjacent to each other in the tire circumferential direction are disposed at intervals of two pitches (2×P) of the zigzag of the crown circumferential groove 3. The crown block 8 formed by the crown lateral grooves 5 having such a structure has a relatively large length in the tire circumferential direction, and has high block stiffness in the tire circumferential direction. Each crown lateral groove 5 connects between the crown first-side vertex 3a and the shoulder inner-side vertex 4a. Thus, the crown lateral groove 5 is disposed at a portion at which the length of the crown block 8 in the tire axial direction is small, so that block stiffness on both end portions of the crown block 8 in the tire circumferential direction is also maintained high. Therefore, the crown block 8 exhibits excellent uneven wear resistance. In the present embodiment, each crown lateral groove 5 is disposed so as to connect between an alternate one of the crown first-side vertexes 3a aligned in the tire circumferential direction and an alternate one of the shoulder inner-side vertexes 4a aligned in the tire circumferential direction.

The plurality of crown blocks 8 has a plurality of crown sub-grooves 10 each having a groove width W3 less than a groove width W2 of each of the plurality of crown lateral grooves 5. The crown block 8 having such a structure exhibits a high edge effect. The plurality of crown sub-grooves 10 each include at least two transverse grooves 11 that extend across the crown block 8. The transverse grooves 11 having such a structure allow a water film between the crown block 8 and a road surface to be removed by an edge 11e, whereby wet traction performance is enhanced. In the present specification, the "edge" represents a boundary between a tread surface 8a of the crown block 8 and each groove. In the present specification, the "tread surface" refers to a ground contact surface of the crown block 8 that comes into contact with a plane when a standardized load is applied to the tire 1 in a standardized state and the tire 1 is in contact with the plane at a camber angle of 0°.

The "standardized state" refers to a state in which the tire is mounted on a standardized rim and is inflated to a standardized internal pressure, and no load is applied. In the present specification, unless otherwise specified, the dimension and the like of each component of the tire 1 is represented by a value measured in the standardized state.

The "standardized rim" represents a rim that is defined, in a standard system including a standard on which the tire 1 is based, by the standard for each tire, and is, for example, "standard rim" in the JATMA standard, "Design Rim" in the TRA standard, or "Measuring Rim" in the ETRTO standard.

The "standardized internal pressure" represents an air pressure that is defined, in a standard system including a standard on which the tire 1 is based, by the standard for each tire, and is "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "standardized load" represents a load that is defined, in a standard system including a standard on which the tire 1 is based, by the standard for each tire, and is "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard.

Figure 2:
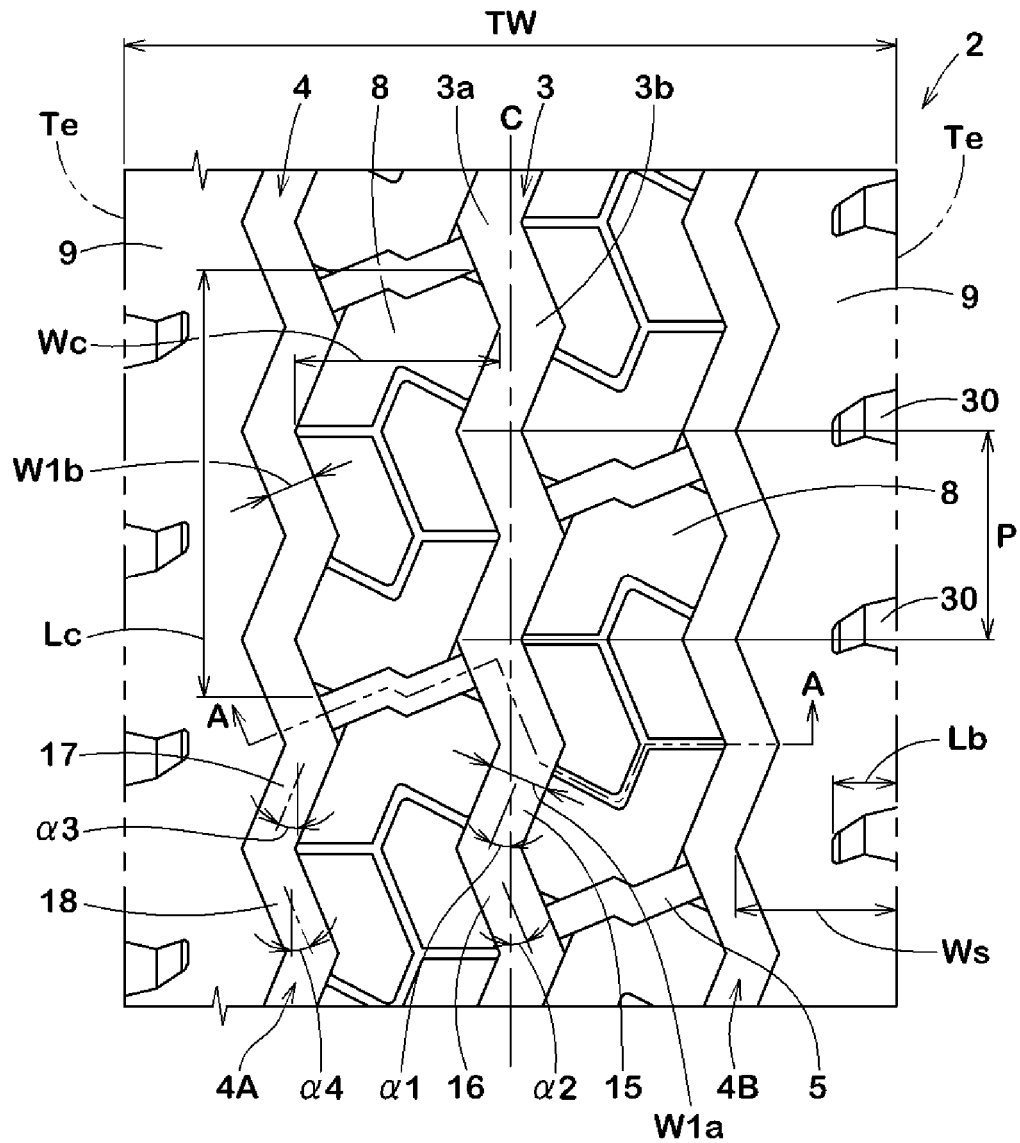
FIG. 2 is a plan view of the tread portion of the present embodiment.

FIG. 2 is a plan view of a portion of the tread portion 2 between tread ends Te and Te. As shown in FIG. 2, in the present embodiment, the tread portion 2 is formed to have a pattern that is point-symmetric with respect to any point on the tire equator C. The shape of the tread portion 2 is not limited to such a point-symmetric pattern.

In the present specification, the "tread end Te" represents the outermost ground contact position in the tire axial direction as obtained when a standardized load is applied to the tire 1 in a standardized state and the tire 1 is in contact with a flat plane at a camber angle of 0°. A distance between the tread ends Te on both sides in the tire axial direction is a tread width TW.

In the present embodiment, the crown circumferential groove 3 is disposed on the tire equator C. In the present embodiment, the shoulder circumferential grooves 4 are disposed on both sides of the crown circumferential groove 3 in the tire axial direction. Thus, the crown blocks 8 are disposed on both sides of the tire equator C. In FIG. 2, the crown first-side vertex 3a corresponds to a portion protruding on the left side of the crown circumferential groove 3 in terms of the crown circumferential groove 3 and a shoulder circumferential groove 4A on the left side. Meanwhile, the portion protruding on the left side corresponds to a crown inner-side vertex (not shown) in terms of the crown circumferential groove 3 and a shoulder circumferential groove 4B on the right side. In the present specification, a tread pattern on the left side of the crown circumferential groove 3 will be described below, and description about a tread pattern on the right side of the crown circumferential groove 3 is omitted.

One pitch P of the zigzag is the same between the crown circumferential groove 3 and the shoulder circumferential groove 4. Thus, a difference in block stiffness is maintained small on both sides of the crown block 8 in the tire axial direction, so that uneven wear resistance is maintained high.

In the present embodiment, the crown circumferential groove 3 includes first crown groove portions 15 inclined in the same direction relative to the tire circumferential direction, and second crown groove portions 16 inclined in the direction opposite to the direction of the first crown groove portions 15. In FIG. 2, the first crown groove portion 15 is inclined in the upper-right direction. The second crown groove portion 16 is inclined in the upper-left direction. In the present embodiment, the first crown groove portion 15 and the second crown groove portion 16 extend linearly. The first crown groove portion 15 and the second crown groove portion 16 may extend so as to form, for example, arc-like shapes. For example, the first crown groove portions 15 and the second crown groove portions 16 alternate in the tire circumferential direction.

In the present embodiment, the shoulder circumferential groove 4 includes first shoulder groove portions 17 inclined in the same direction relative to the tire circumferential direction, and second shoulder groove portions 18 inclined in the direction opposite to the direction of the first shoulder groove portions 17. In FIG. 2, the first shoulder groove portion 17 is inclined in the upper-right direction. The second shoulder groove portion 18 is inclined in the upper-left direction. In the present embodiment, the first shoulder groove portion 17 and the second shoulder groove portion 18 extend linearly. In the present embodiment, the first shoulder groove portion 17 and the second shoulder groove portion 18 may extend so as to form arc-like shapes. For example, the first shoulder groove portions 17 and the second shoulder groove portions 18 alternate in the tire circumferential direction.

Each of an angle $\alpha 1$ of the first crown groove portion 15 relative to the tire circumferential direction, an angle $\alpha 2$ of the second crown groove portion 16 relative to the tire circumferential direction, an angle $\alpha 3$ of the first shoulder groove portion 17 relative to the tire circumferential direction, and an angle $\alpha 4$ of the second shoulder groove portion 18 relative to the tire circumferential direction is preferably 10 to 30°. In the present embodiment, the angle $\alpha 1$ of the first crown groove portion 15, the angle $\alpha 2$ of the second crown groove portion 16, the angle $\alpha 3$ of the first shoulder groove portion 17, and the angle $\alpha 4$ of the second shoulder groove portion 18 are equal to each other.

A groove width W1a of the crown circumferential groove 3 is, but is not particularly limited to, greater than a groove width W1*b* of the shoulder circumferential groove 4. Thus, a water film near the tire equator C is smoothly removed. The groove width W1*a* of the crown circumferential groove 3 is preferably 1.1 times the groove width W1*b* of the shoulder circumferential groove 4 or more and more preferably 1.2 times the groove width W1*b* or more, and preferably 1.5 times the groove width W1*b* or less and more preferably 1.4 times the groove width W1*b* or less. The groove width W1*a* of the crown circumferential groove 3 is preferably 8% of the tread width TW or more and more preferably 10% thereof or more, and preferably 16% thereof or less and more preferably 14% thereof or less.

Figure 3:
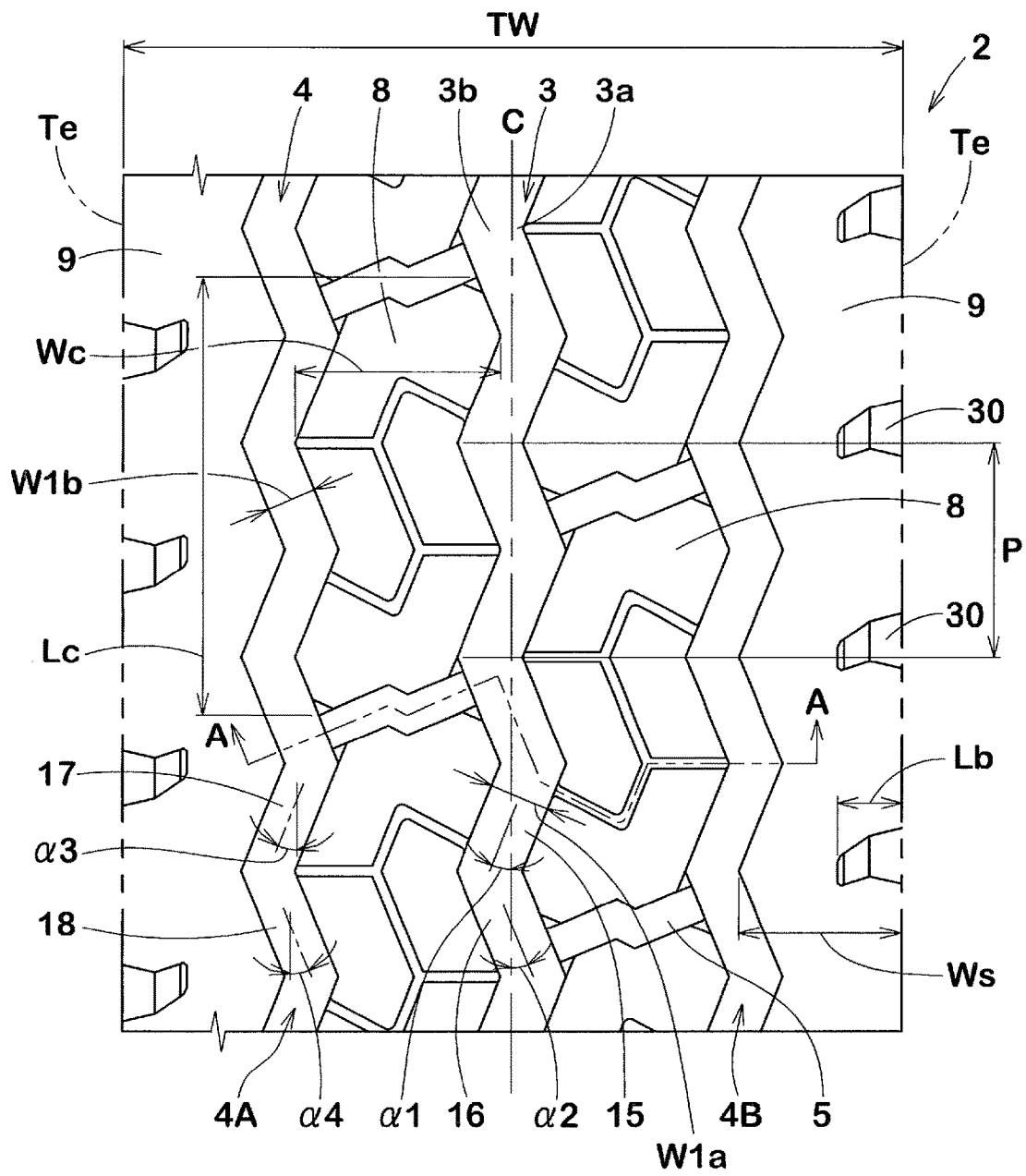
FIG. 3 is a cross-sectional view taken along a line A-A in FIG. 2.

FIG. 3 is a cross-sectional view taken along a line A-A in FIG. 2. As shown in FIG. 3, a groove depth D1*a* of the crown circumferential groove 3 is preferably 15 to 23 mm. In the present embodiment, a groove depth D1*b* of the shoulder circumferential groove 4 is equal to the groove depth D1*a* of the crown circumferential groove 3.

Figure 4:
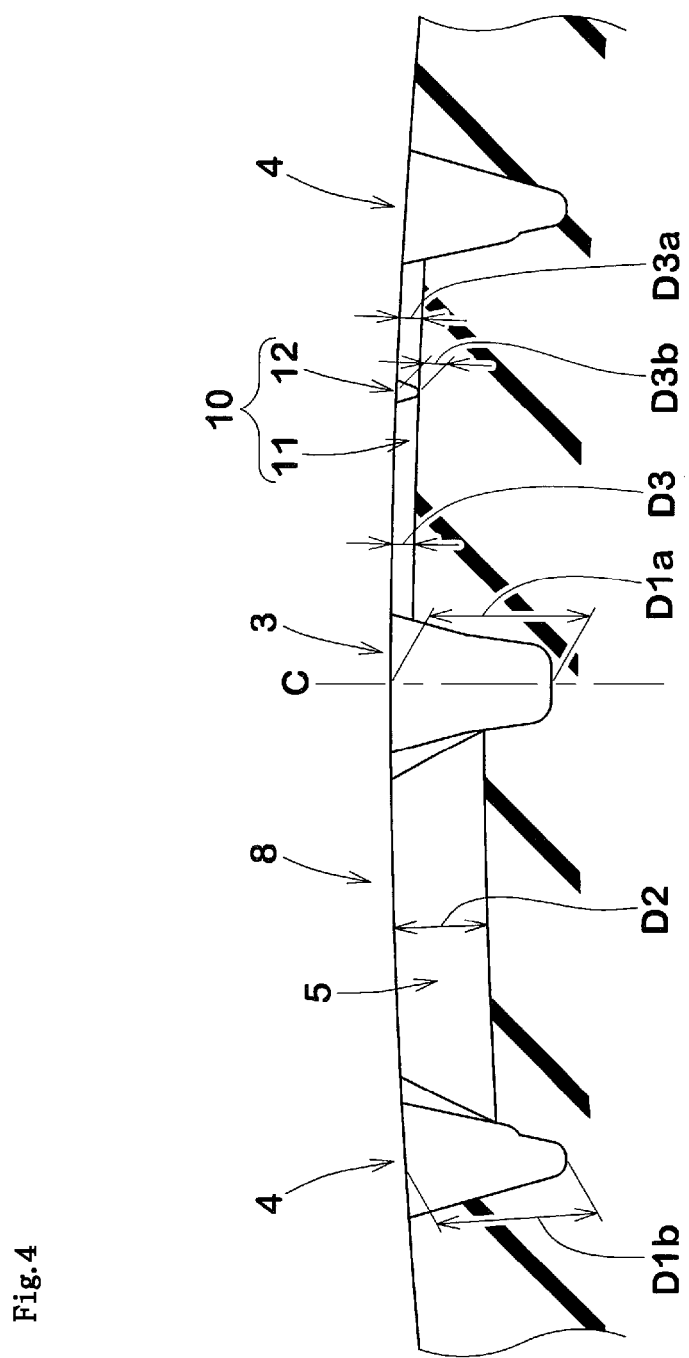
FIG. 4 is an enlarged plan view of the tread portion of the present embodiment.

FIG. 4 is an enlarged plan view of the tread portion 2. As shown in FIG. 4, in the present embodiment, the crown lateral groove 5 includes a first portion 21 connected to the crown first-side vertex 3*a*, a second portion 22 connected to the shoulder inner-side vertex 4*a*, and a third portion 23 connected to the first portion 21 and the second portion 22. In the present embodiment, the first portion 21, the second portion 22, and the third portion 23 extend linearly. The first portion 21, the second portion 22, and the third portion 23 may extend so as to form arc-like shapes.

For example, the first portions 21 are inclined in the same direction relative to the tire axial direction. For example, the second portions 22 are inclined in the same direction as the first portions 21 relative to the tire axial direction. In the present embodiment, the third portions 23 are inclined in the direction opposite to that of the first portions 21 relative to the tire axial direction. Thus, in the present embodiment, a length La of the crown lateral groove 5 in the tire circumferential direction is maintained relatively small, so that block stiffness is maintained higher on both end portions of the crown block 8 in the tire circumferential direction.

For example, the first portion 21 includes a first constant-width portion 21*a* extending with the same groove width in the longitudinal direction, and a first increased-width portion 21*b* which is connected to the first constant-width portion 21*a* and which extends to the crown first-side vertex 3*a* with a continuously increased groove width. In the present embodiment, one end of the first increased-width portion 21*b* in the tire circumferential direction is connected to the crown outer-side vertex 3*a*. More specifically, one edge 21*e* of the first increased-width portion 21*b* and an edge 15*e* of the first crown groove portion 15 extend so as to form one straight line. Thus, occurrence of uneven wear of the crown block 8 can be effectively inhibited. In the present specification, the groove width is a width of a groove at a position where the groove has the maximum width in the tire radial direction, and is a width of each groove at the tread surface 8*a* in the present embodiment.

For example, the second portion 22 includes a second constant-width portion 22*a* extending with the same groove width in the longitudinal direction, and a second increased-width portion 22*b* which is connected to the second constant-width portion 22*a* and which extends to the shoulder inner-side vertex 4*a* with a continuously increased groove width. In the present embodiment, one end of the second increased-width portion 22*b* in the tire circumferential direction is connected to the shoulder inner-side vertex 4*a*. More specifically, one edge 22*e* of the second increased-width portion 22*b* and an edge 17*e* of the first shoulder groove portion 17 extend so as to form one straight line.

Each of an angle α5 of the first portion 21 relative to the tire axial direction and an angle α6 of the second portion 22 relative to the tire axial direction is, but is not particularly limited to, preferably 10 to 30°. Each of an angle α7 between the first portion 21 and the third portion 23 and an angle α8 between the second portion 22 and the third portion 23 is preferably 90 to 140°.

The groove width W2 of the crown lateral groove 5 is less than the groove width W1*b* of the shoulder circumferential groove 4. The groove width W2 of the crown lateral groove 5 is preferably 60% to 90% of the groove width W1*b* of the shoulder circumferential groove 4. A groove depth D2 (shown in FIG. 3) of the crown lateral groove 5 is less than the groove depth D1*b* of the shoulder circumferential groove 4. The groove depth D2 of the crown lateral groove 5 is preferably 45% to 75% of the groove depth D1*b* of the shoulder circumferential groove 4. In the present specification, the groove width W2 of the crown lateral groove 5 is a groove width at the first constant-width portion 21*a* or the second constant-width portion 22*a*.

As shown in FIG. 2, in each of the plurality of crown blocks 8, a ratio (Lc/Wc) of the maximum length Lc in the tire circumferential direction to the maximum length Wc in the tire axial direction is preferably 1.8 or more and more preferably 1.9 or more, and preferably 2.2 or less and more preferably 2.1 or less. Since the ratio (Lc/Wc) is 1.8 or more, block stiffness of the crown block 8 in the tire circumferential direction can be enhanced, and high uneven wear resistance can be exhibited. Since the ratio (Lc/Wc) is 2.2 or less, the number of the crown lateral grooves 5 is maintained and wet traction performance is enhanced.

In order to effectively exhibit the above-described effect, the maximum length Wc of the crown block 8 is preferably 18% of the tread width TW or more and more preferably 20% thereof or more, and preferably 32% thereof or less and more preferably 30% thereof or less. The number of the crown blocks 8 arranged in the tire circumferential direction is preferably 23 to 33.

Figure 5:
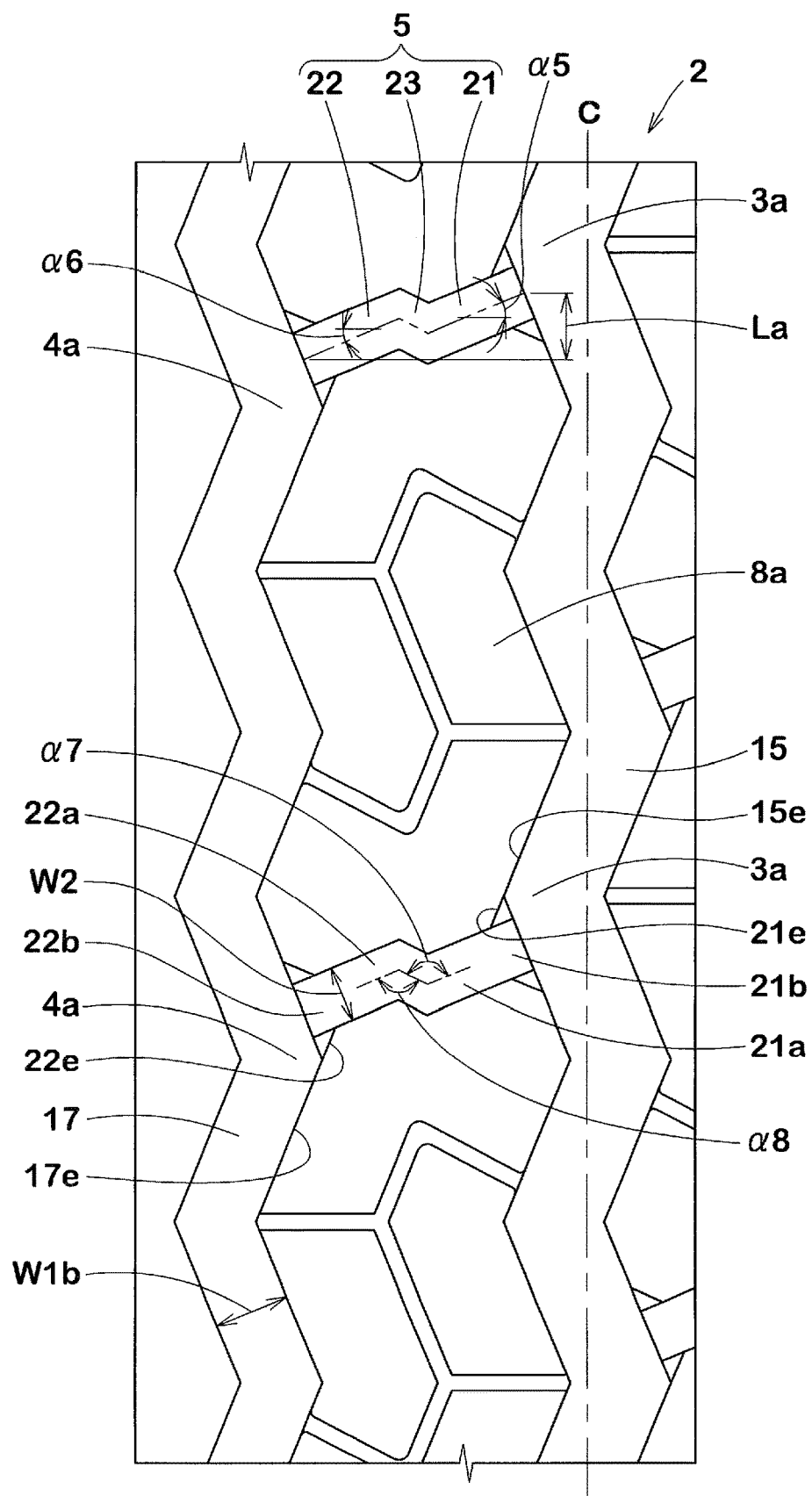
FIG. 5 is an enlarged plan view of the tread portion of the present embodiment.

FIG. 5 is an enlarged plan view of the tread portion 2. As shown in FIG. 5, each of the at least two transverse grooves 11 includes a plurality of zigzag vertexes 11*t* and thus zigzags. The transverse groove 11 having such a structure has a great edge component, and highly exhibits an effect of scraping and removing a water film.

Each of the at least two transverse grooves 11 includes a first element 25, a second element 26, and a third element 27 between the first element 25 and the second element 26. For example, the first element 25 is connected to the crown circumferential groove 3 or one of the shoulder circumferential grooves 4, and extends such that an angle α11 thereof relative to the tire axial direction is less than 20°. For example, the second element 26 is inclined relative to the tire axial direction at an angle α12 greater than the angle of the first element 25. For example, the third element 27 extends at an angle α13 greater than the angle of the second element 26 relative to the tire axial direction. Thus, the first element 25, the second element 26, and the third element 27 are inclined at different angles, so that the transverse groove 11 has a great edge component, and exhibits an edge effect in multiple directions.

In order to effectively exhibit the above-described effect, in the present embodiment, the first element 25 extends parallel to the tire axial direction (angle α11=0°). The angle α12 of the second element 26 is preferably 20° or more and more preferably 25° or more, and preferably 40° or less and more preferably 35° or less.

Each of an angle α16 between the first element 25 and the third element 27, and an angle α17 between the second element 26 and the third element 27 is preferably 80° or more and more preferably 85° or more, and preferably 120° or less and more preferably 115° or less. Since the angle α16 and the angle α17 are each 80° or more, stiffness is maintained high at a portion of the crown block 8 between the first element 25 and the third element 27, and a portion of the crown block 8 between the second element 26 and the third element 27. Since the angle α16 and the angle α17 are each 120° or less, the edge effect can be exhibited for running in different directions.

In the present embodiment, the first element 25, the second element 26, and the third element 27 extend linearly. For example, the first element 25, the second element 26, and the third element 27 may extend so as to form arc-like shapes.

In the present embodiment, the first element 25 communicates with the crown second-side vertex 3b or the shoulder outer-side vertex 4b. The first element 25 having such a structure allows reduction of a difference in block stiffness between the crown blocks 8 on both sides, in the tire circumferential direction, of the crown second-side vertex 3b or the shoulder outer-side vertex 4b across the first element 25, whereby occurrence of uneven wear is inhibited. In the present embodiment, each of the second elements 26 is not connected to any vertex, and is connected to the first crown groove portion 15 or the first shoulder groove portion 17. The second element 26 having such a structure inhibits reduction of block stiffness at a portion of the crown block 8, adjacent to the crown first-side vertex 3a, at which stress is concentrated, and at a portion of the crown block 8, adjacent to the shoulder inner-side vertex 4a, at which stress is concentrated.

In the present embodiment, each transverse groove 11 includes a first transverse groove 11A in which the first element 25 is connected to the crown circumferential groove 3, and a second transverse groove 11B in which the first element 25 is connected to the shoulder circumferential groove 4. In the present embodiment, the first element 25 of the first transverse groove 11A is connected to the crown second-side vertex 3b. In the present embodiment, the first element 25 of the second transverse groove 11B is connected to the shoulder outer-side vertex 4b.

In the present embodiment, the second element 26 of the first transverse groove 11A is inclined relative to the tire axial direction in the same direction as the second element 26 of the second transverse groove 11B. Thus, reduction of block stiffness of the crown block 8 is inhibited, and uneven wear resistance is maintained high. For example, the second element 26 of the first transverse groove 11A extends parallel to the second element 26 of the second transverse groove 11B. The "parallel" means that an absolute value 1α12a-α12b1 of a difference between the angle α12a of the second element 26 of the first transverse groove 11A relative to the tire axial direction and the angle α12b of the second element 26 of the second transverse groove 11B relative to the tire axial direction is 0°, and further means that the absolute value 1α12a-α12bl is 10° or less.

In order to effectively exhibit the above-described effect, in the present embodiment, the third element 27 of the first transverse groove 11A is preferably inclined relative to the tire axial direction in the same direction as the third element 27 of the second transverse groove 11B. For example, the third element 27 of the first transverse groove 11A is preferably parallel to the third element 27 of the second transverse groove 11B.

The plurality of crown sub-grooves 10 each include a connecting groove 12 for connecting a plurality of the transverse grooves 11. The connecting groove 12 having such a structure allows an edge component to be increased and allows wet traction performance to be further enhanced. In the present embodiment, the connecting groove 12 extends linearly.

For example, the connecting groove 12 connects between the zigzag vertexes 11t and 11t of the respective transverse grooves 11. In the present embodiment, the connecting groove 12 connects between the vertex 11t connecting to the first element 25 of the first transverse groove 11A and the vertex 11t connecting to the first element 25 of the second transverse groove 11B.

For example, the connecting groove 12 extends parallel to the second crown groove portion 16 and the second shoulder groove portion 18. The connecting groove 12 having such a structure inhibits great reduction of block stiffness of the crown block 8, and allows uneven wear resistance to be maintained high.

The maximum groove width W3 (shown in FIG. 1) of each crown sub-groove 10 is preferably 0.25 times the maximum groove width W2 of each crown lateral groove 5 or more and more preferably 0.30 times the maximum groove width W2 or more, and preferably 0.50 times the maximum groove width W2 or less and more preferably 0.45 times the maximum groove width W2 or less. Since the groove width W3 of the crown sub-groove 10 is 0.25 times the groove width W2 of the crown lateral groove 5 or more, wet traction performance can be enhanced. Since the groove width W3 of the crown sub-groove 10 is 0.50 times the groove width W2 of the crown lateral groove 5 or less, block stiffness of the crown block 8 can be maintained high.

For example, a groove width W3a of the transverse groove 11 is equal to a groove width W3b of the connecting groove 12. In the present embodiment, a groove depth D3a of the transverse groove 11 is equal to a groove depth D3b (shown in FIG. 3) of the connecting groove 12.

As shown in FIG. 3, the maximum groove depth D3 of the plurality of crown sub-grooves 10 is preferably less than the maximum groove depth D2 of the plurality of the crown lateral grooves 5. The crown sub-groove 10 having such a structure enhances wet traction performance of, in particular, a new tire. The maximum groove depth D3 of each crown sub-groove 10 is preferably 0.1 times the maximum groove depth D2 of each crown lateral groove 5 or more and more preferably 0.2 times the maximum groove depth D2 or more, and preferably 0.4 times the maximum groove depth D2 or less and more preferably 0.3 times the maximum groove depth D2 or less. Since the groove depth D3 of the crown sub-groove 10 is 0.1 times the groove depth D2 of the crown lateral groove 5 or more, wet traction performance can be enhanced. Since the groove depth D3 of the crown sub-groove 10 is 0.5 times the groove depth D2 of the crown lateral groove 5 or less, block stiffness of the crown block 8 can be maintained high.

As shown in FIG. 2, the tread portion 2 of the present embodiment includes a pair of shoulder land portions 9 each disposed between the shoulder circumferential groove 4 and the tread end Te. In the present embodiment, each shoulder land portion 9 has a plurality of shoulder lateral grooves 30 that extends inwardly from the tread end Te in the tire axial direction, and terminates in the shoulder land portion 9.

For example, the shoulder lateral grooves 30 are disposed at intervals of one pitch P of the zigzag of the shoulder circumferential groove 4. In the present embodiment, a length Lb of the shoulder lateral groove 30 in the tire axial direction is 30% to 50% of the maximum width Ws of the shoulder land portion 9 in the tire axial direction.

Although one embodiment of the present disclosure has been described above in detail, the present disclosure is not limited to the above-described specific embodiment, and various modifications can be made to implement the technique of the present disclosure.

APPENDIX

The present disclosure includes the following aspects.

[Disclosure 1]
A heavy duty pneumatic tire including
a tread portion, in which
the tread portion includes a crown circumferential groove continuously extending on a tire equator side in a tire circumferential direction, a shoulder circumferential groove continuously extending in the tire circumferential direction on a side outward of the crown circumferential groove in a tire axial direction, a plurality of crown lateral grooves connecting between the crown circumferential groove and the shoulder circumferential groove, and a plurality of crown blocks formed by the crown circumferential groove, the shoulder circumferential groove, and the plurality of crown lateral grooves,
the crown circumferential groove includes crown first-side vertexes protruding toward the shoulder circumferential groove, and crown second-side vertexes protruding in a direction opposite to that of the crown first-side vertexes, alternately in the tire circumferential direction, and zigzags,
the shoulder circumferential groove includes shoulder inner-side vertexes protruding toward the crown circumferential groove, and shoulder outer-side vertexes protruding in a direction opposite to that of the shoulder inner-side vertexes, alternately in the tire circumferential direction, and zigzags,
the plurality of crown lateral grooves that are directly adjacent to each other in the tire circumferential direction are disposed at two pitch intervals of a zigzag of the crown circumferential groove and connect between the crown first-side vertexes and the shoulder inner-side vertexes,
the plurality of crown blocks has a plurality of crown sub-grooves each having a groove width less than a groove width of each of the plurality of crown lateral grooves, and
the plurality of crown sub-grooves each include at least two transverse grooves extending across the crown blocks.

[Disclosure 2]
The heavy duty pneumatic tire according to Disclosure 1, in which each of the at least two transverse grooves includes a plurality of zigzag vertexes and zigzags.

[Disclosure 3]
The heavy duty pneumatic tire according to Disclosure 1 or 2, in which
each of the at least two transverse grooves includes a first element, a second element, and a third element between the first element and the second element,
the first element is connected to the crown circumferential groove or one of the shoulder circumferential grooves, and extends such that an angle of the first element relative to the tire axial direction is less than 20°, and
the second element is inclined relative to the tire axial direction at an angle greater than that of the first element.

[Disclosure 4]
The heavy duty pneumatic tire according to Disclosure 3, in which
the first element extends parallel to the tire axial direction, and
the angle of the second element relative to the tire axial direction is 20 to 40°.

[Disclosure 5]
The heavy duty pneumatic tire according to Disclosure 3 or 4, in which an angle between the first element and the third element, and an angle between the second element and the third element are each 80 to 120°.

[Disclosure 6]
The heavy duty pneumatic tire according to any one of Disclosures 3 to 5, in which the first element communicates with the crown second-side vertex or the shoulder outer-side vertex.

[Disclosure 7]
The heavy duty pneumatic tire according to any one of Disclosures 3 to 6, in which each of the transverse grooves includes a first transverse groove in which the first element is connected to the crown circumferential groove, and a second transverse groove in which the first element is connected to the shoulder circumferential groove.

[Disclosure 8]
The heavy duty pneumatic tire according to Disclosure 7, in which the second element of the first transverse groove is inclined relative to the tire axial direction in a same direction as the second element of the second transverse groove.

[Disclosure 9]
The heavy duty pneumatic tire according to any one of Disclosures 1 to 8, in which the plurality of crown sub-grooves includes connecting grooves for connecting the plurality of transverse grooves.

[Disclosure 10]
The heavy duty pneumatic tire according to any one of Disclosures 1 to 9, in which a maximum groove width of each of the plurality of crown sub-grooves is 0.25 to 0.50 times a maximum groove width of each of the plurality of crown lateral grooves.

[Disclosure 11]
The heavy duty pneumatic tire according to any one of Disclosures 1 to 10, in which a maximum groove depth of each of the plurality of crown sub-grooves is 0.1 to 0.4 times a maximum groove depth of each of the plurality of crown lateral grooves.

[Disclosure 12]
The heavy duty pneumatic tire according to any one of Disclosures 1 to 11, in which, in each of the plurality of crown blocks, a ratio (Lc/Wc) of a maximum length Lc in the tire circumferential direction to a maximum length We in the tire axial direction is 1.8 to 2.2.

The heavy duty tire of the present disclosure has the above-described configuration, and can thus enhance wet traction performance while maintaining excellent uneven wear resistance.

What is claimed is:
1. A heavy duty pneumatic tire comprising:
a tread portion,
wherein the tread portion comprises a crown circumferential groove continuously extending on a tire equator side in a tire circumferential direction, a shoulder circumferential groove continuously extending in the tire circumferential direction on a side outward of the crown circumferential groove in a tire axial direction, a plurality of crown lateral grooves connecting between the crown circumferential groove and the shoulder circumferential groove, and a plurality of crown blocks formed by the crown circumferential groove, the shoulder circumferential groove, and the plurality of crown lateral grooves, wherein the crown circumferential groove comprises crown first-side vertexes protruding toward the shoulder circumferential groove, and crown second-side vertexes protruding in a direction opposite to that of the crown first-side vertexes, alternately in the tire circumferential direction, and zigzags, wherein the shoulder circumferential groove comprises shoulder inner-side vertexes protruding toward the crown circumferential groove, and shoulder outer-side vertexes protruding in a direction opposite to that of the shoulder inner-side vertexes, alternately in the tire circumferential direction, and zigzags, wherein the plurality of crown lateral grooves that are directly adjacent to each other in the tire circumferential direction are disposed at two pitch intervals of a zigzag of the crown circumferential groove and connect between the crown first-side vertexes and the shoulder inner-side vertexes, wherein the plurality of crown blocks has a plurality of crown sub-grooves each having a groove width less than a groove width of each of the plurality of crown lateral grooves, wherein the plurality of crown sub-grooves each comprise at least two transverse grooves extending across the crown blocks, and wherein a groove width of each of the plurality of crown lateral grooves is less than a groove width of the shoulder circumferential groove.

2. The heavy duty pneumatic tire according to claim 1, wherein a maximum groove width of each of the plurality of crown sub-grooves is 0.25 to 0.50 times a maximum groove width of each of the plurality of crown lateral grooves.

3. The heavy duty pneumatic tire according to claim 1, wherein a maximum groove depth of each of the plurality of crown sub-grooves is 0.1 to 0.4 times a maximum groove depth of each of the plurality of crown lateral grooves.

4. The heavy duty pneumatic tire according to claim 1, wherein, in each of the plurality of crown blocks, a ratio (Lc/Wc) of a maximum length Lc in the tire circumferential direction to a maximum length Wc in the tire axial direction is 1.8 to 2.2.

5. The heavy duty pneumatic tire according to claim 1, wherein one pitch of a zigzag of the crown circumferential groove is the same as one pitch of a zigzag of the shoulder groove.

6. The heavy duty pneumatic tire according to claim 1, wherein the plurality of crown sub-grooves comprises connecting grooves for connecting the plurality of transverse grooves.

7. The heavy duty pneumatic tire according to claim 6, wherein the crown circumferential groove includes a plurality of first crown groove portions inclined in a same direction relative to the tire circumferential direction, and a plurality of second crown groove portions inclined in a direction opposite to the direction of the plurality of first crown groove portions relative to the tire circumferential direction, wherein the shoulder circumferential groove includes a plurality of first shoulder groove portions inclined in a same direction relative to the tire circumferential direction, and a plurality of second shoulder groove portions inclined in a direction opposite to the direction of the plurality of first shoulder groove portions relative to the tire circumferential direction, and wherein the connecting groove extends parallel to the plurality of second crown groove portions and the plurality of second shoulder groove portions.

8. The heavy duty pneumatic tire according to claim 7, wherein an angle of the first crown groove portion relative to the tire circumferential direction, an angle of the second crown groove portion relative to the tire circumferential direction, an angle of the first shoulder groove portion relative to the tire circumferential direction, and an angle of the second shoulder groove portion relative to the tire circumferential direction are each 10° to 30°.

9. The heavy duty pneumatic tire according to claim 1, wherein each of the at least two transverse grooves comprises a plurality of zigzag vertexes and zigzags.

10. The heavy duty pneumatic tire according to claim 9, wherein each of the at least two transverse grooves comprises a first element, a second element, and a third element between the first element and the second element, wherein the first element is connected to the crown circumferential groove or one of the shoulder circumferential grooves, and extends such that an angle of the first element relative to the tire axial direction is less than 20°, and wherein the second element is inclined relative to the tire axial direction at an angle greater than that of the first element.

11. The heavy duty pneumatic tire according to claim 10, wherein the first element extends parallel to the tire axial direction, and wherein the angle of the second element relative to the tire axial direction is 20 to 40°.

12. The heavy duty pneumatic tire according to claim 10, wherein an angle between the first element and the third element, and an angle between the second element and the third element are each 80 to 120°.

13. The heavy duty pneumatic tire according to claim 10, wherein the first element communicates with the crown second-side vertex or the shoulder outer-side vertex.

14. The heavy duty pneumatic tire according to claim 10, wherein each of the transverse grooves comprises a first transverse groove in which the first element is connected to the crown circumferential groove, and a second transverse groove in which the first element is connected to the shoulder circumferential groove.

15. The heavy duty pneumatic tire according to claim 14, wherein the second element of the first transverse groove is inclined relative to the tire axial direction in a same direction as the second element of the second transverse groove.

16. The heavy duty pneumatic tire according to claim 10, wherein the first element, the second element and the third element are each inclined at different angles relative to the tire axial direction.

17. A heavy duty pneumatic tire comprising:
a tread portion,
wherein the tread portion comprises a crown circumferential groove continuously extending on a tire equator side in a tire circumferential direction, a shoulder circumferential groove continuously extending in the tire circumferential direction on a side outward of the crown circumferential groove in a tire axial direction, a plurality of crown lateral grooves connecting between the crown circumferential groove and the shoulder circumferential groove, and a plurality of crown blocks formed by the crown circumferential groove, the shoulder circumferential groove, and the plurality of crown lateral grooves, wherein the crown circumferential groove comprises crown first-side vertexes protruding toward the shoulder circumferential groove, and crown second-side vertexes protruding in a direction opposite to that of the crown first-side vertexes, alternately in the tire circumferential direction, and zigzags, wherein the shoulder circumferential groove comprises shoulder inner-side vertexes protruding toward the crown circumferential groove, and shoulder outer-side vertexes protruding in a direction opposite to that of the shoulder inner-side vertexes, alternately in the tire circumferential direction, and zigzags, wherein the plurality of crown lateral grooves that are directly adjacent to each other in the tire circumferential direction are disposed at two pitch intervals of a zigzag of the crown circumferential groove and connect between the crown first-side vertexes and the shoulder inner-side vertexes, wherein the plurality of crown blocks has a plurality of crown sub-grooves each having a groove width less than a groove width of each of the plurality of crown lateral grooves, wherein the plurality of crown sub-grooves each comprise at least two transverse grooves extending across the crown blocks, wherein each of the at least two transverse grooves comprises a plurality of zigzag vertexes and zigzags, wherein the plurality of crown sub-grooves comprises connecting grooves for connecting the plurality of transverse grooves, wherein, in each of the plurality of crown blocks, a ratio (Lc/Wc) of a maximum length Lc in the tire circumferential direction to a maximum length Wc in the tire axial direction is 1.8 to 2.2, and wherein a groove width of each of the plurality of crown lateral grooves is less than a groove width of the shoulder circumferential groove.

18. The heavy duty pneumatic tire according to claim 17, wherein the connecting grooves are configured to connect the at least two transverse grooves at one of the plurality of zigzag vertexes of each of the at least two transverse grooves.

19. The heavy duty pneumatic tire according to claim 18, wherein only the plurality of crown sub-grooves are provided in each of the plurality of crown blocks.

20. The heavy duty pneumatic tire according to claim 17, wherein a depth of the connecting grooves is equal to a depth of the plurality of transverse grooves.

* * * * *